(12) United States Patent
Rao (10) Patent No.: US 6,961,775 B2
(45) Date of Patent: Nov. 1, 2005

(54) METHOD, SYSTEM, AND PROGRAM FOR ENABLING COMMUNICATION BETWEEN DEVICES USING DIFFERENT ADDRESS FORMATS

(75) Inventor: Raghavendra Rao, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 879 days.

(21) Appl. No.: 09/826,081

(22) Filed: Apr. 4, 2001

(65) Prior Publication Data

US 2002/0147817 A1 Oct. 10, 2002

(51) Int. Cl.[7] .............................................. G06F 15/16
(52) U.S. Cl. ...................... 709/228; 709/226; 709/227; 709/229; 709/245; 370/352; 370/355
(58) Field of Search ................................. 709/200–203, 709/218, 226–229, 238–239, 245–246; 370/351–356, 401, 432, 395.52, 395.53, 395.54

(56) References Cited

U.S. PATENT DOCUMENTS

| | | | | |
|---|---|---|---|---|
| 5,835,723 A | * | 11/1998 | Andrews et al. ............ | 709/226 |
| 5,857,080 A | | 1/1999 | Jander et al. ............... | 370/402 |
| 5,974,452 A | * | 10/1999 | Karapetkov et al. ........ | 709/218 |
| 6,081,836 A | * | 6/2000 | Karapetkov et al. ........ | 709/245 |
| 6,118,776 A | | 9/2000 | Berman ...................... | 370/451 |
| 6,137,799 A | * | 10/2000 | Karapetkov et al. ... | 370/395.53 |
| 6,292,838 B1 | * | 9/2001 | Nelson ....................... | 709/245 |
| 6,321,255 B1 | * | 11/2001 | May et al. .................. | 709/245 |
| 6,542,935 B1 | * | 4/2003 | Ishii ........................... | 709/245 |
| 6,587,455 B1 | * | 7/2003 | Ray et al. ................... | 370/352 |
| 6,681,259 B1 | * | 1/2004 | Lemilainen et al. ........ | 709/227 |
| 6,687,755 B1 | * | 2/2004 | Ford et al. .................. | 709/245 |
| 6,741,585 B1 | * | 5/2004 | Munoz et al. .............. | 370/352 |
| 6,772,210 B1 | * | 8/2004 | Edholm ...................... | 709/245 |

FOREIGN PATENT DOCUMENTS

| | | | |
|---|---|---|---|
| EP | 0697801 | 2/1996 | .......... H04Q/11/04 |
| EP | 1003315 | 5/2000 | .......... H04L/29/12 |
| EP | 1032162 | 8/2000 | .......... H04L/12/46 |

OTHER PUBLICATIONS

American National Standards Institute, "Fibre Channel: Arbitrated Loop (FC–AL–2)", rev. 7.0, Apr. 1, 1999. i–xiv & 1–140.

American National Standards Institute, "Fibre Channel: Fabric Loop Attachment (FC–FLA)", rev 2.7, Aug. 12, 1997. i–xiv & 1–122.

American National Standards Institute, "Fibre Channel: Private Loop SCSI Direct Attach (FC–PLDA)", rev 2.1, Sep. 22, 1997. i–viii & 1–80.

American National Standards Institute, "Fibre Channel: Switch Fabric–2 (FC–SW–2)", rev 7.0, Oct. 27, 2001. Chapters 3, 4, & 7. i–vi, 3–10, 11–24, & 73–96.

(Continued)

*Primary Examiner*—Bharat Barot
(74) *Attorney, Agent, or Firm*—Meyertons Hood Kivlin Kowert & Goetzel, P.C.; B. Noël Kivlin (57) ABSTRACT

Provided is a computer implemented method, system, and program for enabling communication between a first network device that communicates using a first address format and a second network device that communicates using a second address format. A frame from the first network device directed toward the second network device is received. A determination is made as to whether one address in the second address format is available to communicate with the second network device. A correspondence is defined between the first network device address in the first address format and the determined address in the second address format if one address in the second address format is available, wherein the determined address is used to represent the first network device to the second network device.

56 Claims, 7 Drawing Sheets

OTHER PUBLICATIONS

Clark, Tom. *Designing Storage Area Networks*. Addison-Wesley: Boston, 1999. Ch. 3–4. 23–88.

Dutcher, William. "IP Addressing: Playing the Numbers", *Data Communications*. Mar. 21, 1997. 69–74.

International Search Report issued with International application No. PCT/US02/08746. Search Report Mailed on Oct. 17, 2002.

University of New Hampshire: InterOperability Lab. "Fibre Channel: Tutorials and Resources". Last Updated May 4, 1998. [Retrieved on Feb. 26, 2001] Retrieved from the Internet at <.iol/unh.edu/training/fc/fc_tutorial.html #General_Overview>.

* cited by examiner

METHOD, SYSTEM, AND PROGRAM FOR ENABLING COMMUNICATION BETWEEN DEVICES USING DIFFERENT ADDRESS FORMATS

BACKGROUND OF THE INVENTION

1. Field of the Invention

The present invention relates to a method, system, and program for enabling communication between devices using different address formats.

2. Description of the Related Art

A storage area network (SAN) comprises a network liking one or more servers to one or more storage systems. Each storage system could comprise a Redundant Array of Independent Disks (RAID) array, tape backup, tape library, CD-ROM library, or JBOD (Just a Bunch of Disks) components. One common protocol for enabling communication among the various SAN devices is the Fibre Channel protocol, which uses optical fibers to connect devices and provide high bandwidth communication between the devices. In Fibre Channel terms the "fabric" comprises one or more switches, such as cascading switches, that connect the devices. The link is the two unidirectional fibers, which may comprise an optical wire, transmitting to opposite directions with their associated transmitter and receiver. Each fiber is attached to a transmitter of a port at one end and a receiver of another port at the other end.

The Fibre Channel protocol defines a fabric topology. A fabric includes one or more switches, each switch having multiple ports, also referred to as F_Ports. A fiber link may connect an N_Port, or node port, on a device to one F_Port on the switch. N_Port refers to any port on a non-switch device. An N_Port can communicate with all other N_Ports attached to the fabric to which the N_Port is connected, i.e., N_Ports on the immediate switch or interconnected cascading switches.

Figure 1:
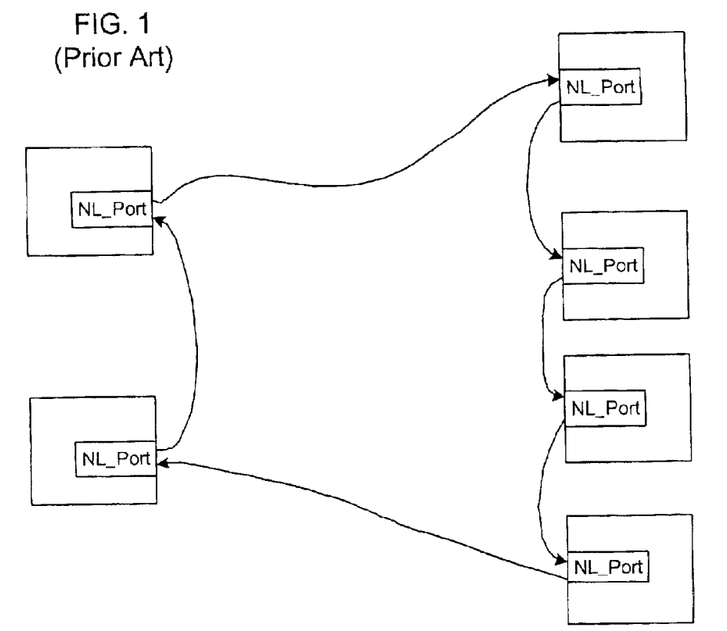
FIGS. 1 and 2 illustrate prior art topologies of devices connected using the Fibre Channel protocol.
Figure 2:
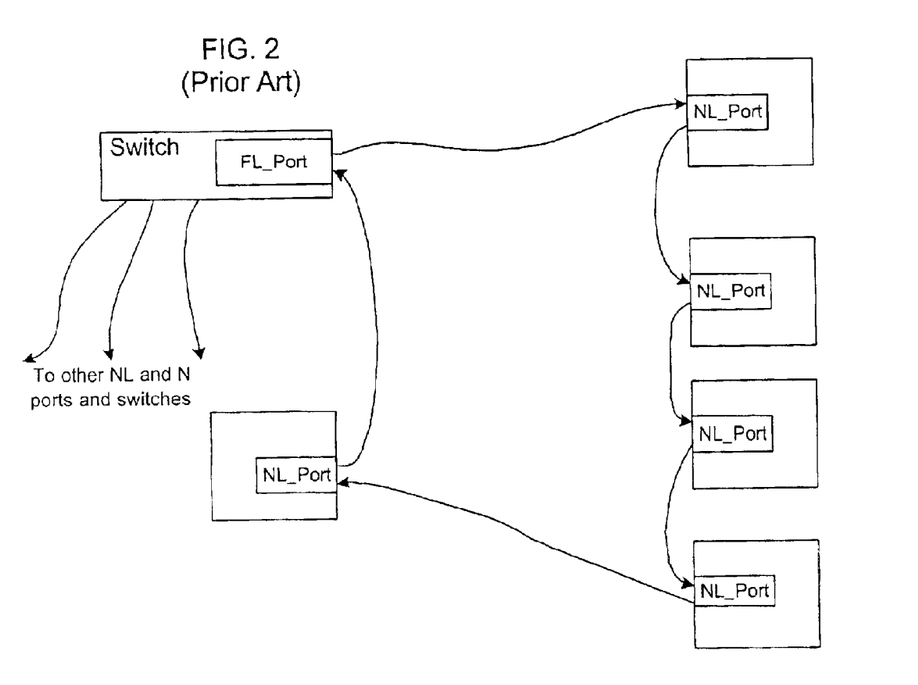

Another common Fibre Channel topology is the loop. The devices in a arbitrated loop are daisy chained together. An L_Port is a port on a device that has arbitrated loop capabilities. An NL_Port is a device port that is part of a loop and capable of communicating with other N_Ports in a fabric. An FL_Port is a switch port connected to a loop. FIG. 1 illustrates an arbitrated loop where the lead from the NL_Port on one device connects to the receiving NL_Port of one other device, all the way until the NL_Port of the last device connects to the receiver NL_Port of the first device in the port. FIG. 1 illustrates a private loop topology where no loop device is connected to a switch. FIG. 2 illustrates an example of a public loop where a switch FL_Port is connected to the arbitrated loop, thereby allowing communication between the fabric devices and the loop devices.

In the Fibre Channel architecture, N_Ports and NL_Ports have a 24 bit port address. In a private loop where there is no switch, the upper two bytes of the address are zeroed to x'00 00'. If the loop is attached to a fabric, i.e., switch and the NL_Port supports fabric login, then the switch assigns the loop identifier that is common to all NL_Ports on the loop as the upper two bytes of the loop device (NL_Port).

In both public and private loops, the last byte of the address is the Arbitrated Loop Physical Address (AL_PA), which identifies the device in the loop.

Numerous installed Fibre Channel configurations utilize a private arbitrated loop, including servers and storage arrays. In the prior art, efforts have been undertaken to allow fabric devices to communicate with private loop devices. This may be desirable to incorporate private loops into larger networks and to allow for scalability of the device population and increase the transmission distance. This is especially important because, as mentioned, most currently installed Fibre Channel configurations are arbitrated private loop configurations.

One technique that may be used to integrate fabric devices into an arbitrated private loop would be to upgrade all the private loop devices to have a 24 bit address, just like the fabric or public loop devices. However, such an upgrade operation would be a substantial undertaking given the number of installed private arbitrated loops. Moreover, many users may be hesitant to perform an upgrade because of concerns that such an upgrade could upset a current satisfactory system configuration. For instance, an upgrade may involve changes to low level software or firmware of the device. System administrators may be inclined against such changes that could have a substantial impact on the entire system performance, especially if the system contains sensitive or very critical data.

Another technique to allow communication between private loop devices and fabric devices involves performing a loop initialization procedure (LIP) to assign the fabric device an 8 bit arbitrated loop address (AL_PA) on the private loop. Loop initialization (LIP) allows new participants onto the private loop, assigns the AL_PAs, and provides notification of topology changes. The fabric device would then use the assigned private loop AL_PA to participate in the private loop just as if the fabric device is physically connected to the private loop. The private loop devices would view the fabric device assigned the 8 bit AL_PA as another private loop device having an 8 bit AL_PA address, even though the fabric device is in fact connected to a switch and uses the full 24 bit address, and may communicate with other fabric devices using the 24 bit address.

An FL_port on the switch connected to the private loop would facilitate communication between the fabric devices assigned the 8 bit AL_PA with the private loop devices. The FL_port on the switch would perform all the functions necessary to obtain the 8 bit private loop address (AL_PA) for the fabric device. Further, when the private loop device transmits a frame destined for the fabric device, the switch port would translate the 8 bit AL_PA of the private loop device in the destination ID field (DID) into the 24 bit fabric address the switch assigned to the transmitting private loop device. The FL_Port would perform similar translation for frames communicated from the fabric device to the private loop device.

One disadvantage of the prior art technique of performing a loop initialization (LIP) to assign each fabric device that wants to communicate on the private loop a private loop AL_PA is that performing the LIP operation will disrupt all the current private loop operations and perform a whole new assignment of addresses to the private loop devices. Further, the FL_Port on the switch connected to the private loop would have to provide notification of the AL_PA changes to all registered nodes in the fabric including the switch, which is disruptive to the fabric devices receiving such notification because they have to perform re-authentication. Further, these notifications may cause a network storm and clutter the network bandwidth. Thus, granting a fabric device access to the private loop by performing a loop initialization (LIP) and assigning the fabric device the 8 bit private loop AL_PA disrupts both the private loop devices and fabric devices.

Further details of the Fibre Channel protocol and attaching private arbitrated loops to a switch are described in the publication "Designing Storage Area Networks: A Practical reference for Implementing Fibre Channel SANs", by Tom Clark (Addison Wesley Longman, 1999), which publication is incorporated herein by reference in its entirety.

Thus, there is a need in the art for improved techniques for allowing fabric devices attached to a switch to communicate with private loop devices.

SUMMARY OF THE DESCRIBED IMPLEMENTATIONS

Provided is a computer implemented method, system, and program for enabling communication between a first network device that communicates using a first address format and a second network device that communicates using a second address format. A frame from the first network device directed toward the second network device is received. A determination is made as to whether one address in the second address format is available to communicate with the second network device. A correspondence is defined between the first network device address in the first address format and the determined address in the second address format if one address in the second address format is available, wherein the determined address is used to represent the first network device to the second network device.

Still further, the first network device may use an address of the second network device in the first address format to communicate with the second network device and the received frame may indicate the first and second network device addresses in the first address format as the source and destination addresses. The first network device address indicated in the frame is set to the defined corresponding address in the second address format for the first network device and the second network device address indicated in the frame is set to a second network device address in the second format. The frame including the first and second network device addresses in the second address format is then transmitted to the second network device.

Additionally, the second network device is a member of a group of network devices that use the second address format to communicate. The first network device uses the defined corresponding address in the second address format to communicate with any member of the group of network devices.

Moreover, correspondences are defined between multiple network device addresses, including the first network device, in the first address format and one determined available address in the second address format. The determined addresses in the second address format are used to represent the multiple network devices to the group of network devices.

In further implementations, the group of network devices comprises an arbitrated loop, such as a private arbitrated loop, attached to a switch. The first network device is capable of communicating with one port on the switch Still Either, the network devices and switch may communicate using the Fibre Channel protocol.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 3:
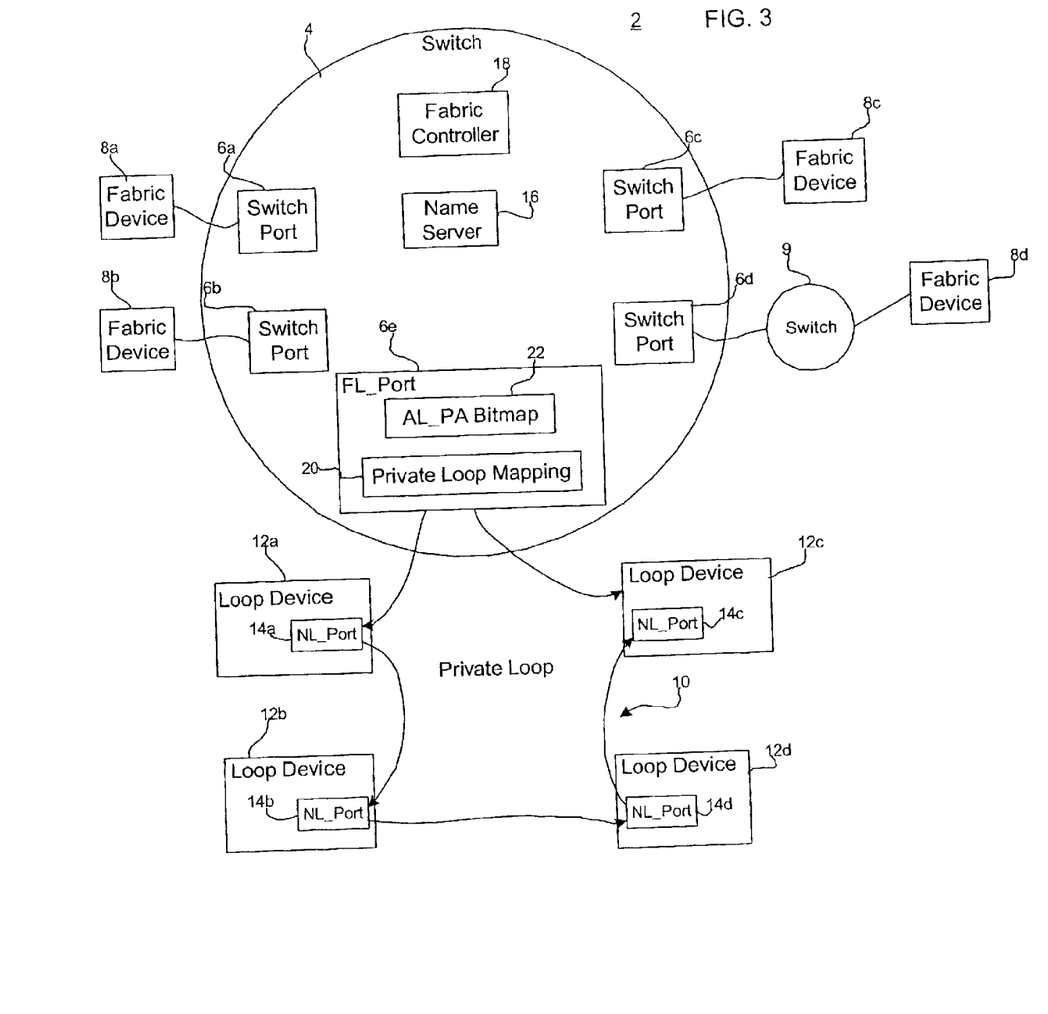
FIG. 3 illustrates a topology of network devices in accordance with certain implementations of the invention.

FIG. 3 illustrates an example of a Fibre Channel network storage topology 2 in which the invention may be implemented. A switch 4 includes multiple switch ports 6a, b, c, d, e. Fabric devices 8a, b, c are attached to the switch ports 6a, b, c, respectively, and fabric device 8d connects to the switch 4 through switch 9, which is attached to port 6d, illustrating a cascading switch arrangement. Each fabric device 8a, b, c, d and the switch 9 includes Fibre Channel ports to communicate with the switch port 6a, b, c, d. The fabric devices 8a, b, c, d may comprise any computing device known in the art, e.g., a server, workstation, mainframe, personal computer, etc., that include Fibre Channel compliant node ports (N__Port) or NL__Ports if the device is part of a loop. The switch ports 6a, b, c, d, e and port on switch 9 (not shown) comprise Fibre Channel compliant F__Ports. Any switch port 6a, b, c, d, e, such as port 6e, attached to an arbitrated loop comprises an FL__Port. In the described implementation, FL__Port 6e is attached to private loop 10 having loop devices 12a, b, c, d. A fabric comprises the interconnected switches 4 and 9 and any devices and loops attached thereto.

Each device that is part of a loop includes an NL__Port. The loop devices 12a, b, c, d include NL__Ports 14a, b, c, d. In the described implementations, each of the ports 6a, b, c, d, e and 14a, b, c, d comprise Fibre Channel ports that implement the Fibre Channel protocols known in the art and include code to execute the protocols of the implementations of the invention described herein. The FL__Port 6e functions as the gateway between the loop devices 12a, b, c, d and the fabric devices 8a, b, c, d.

The switch 4 further includes a name server 16 and fabric controller 18 in which the switch management logic is implemented. The name server 16 comprises a Fibre Channel name server including a database of objects. Each fabric attached device may register or query useful information in the name server 14, including, name, address and class of service capability of other participants. In alternative configurations, the switch 4 may include additional switch ports (F__Ports) to connect to any other number of switches, devices and public/private loops 18. Further details of the switch 4, 9 components are described in the publication entitled "Fibre Channel Switch Fabric—2 (FC-SW—2), Rev. 4.8", working draft proposal of ANSI (Oct. 27, 2000), which publication is incorporated herein by reference in its entirety.

The name server 16 identifies fabric devices 8a, b, c, d and loop devices 12a, b, c, d with a 24 bit address, including an 8 bit area field, an 8 bit domain field and an 8 bit port ID. The domain field provides an address for a group of one or more interconnected switches in a fabric. The area byte provides an address of a switch port to which the device is connected. If the device is part of an arbitrated loop, then the area byte provides a port address shared by devices on the loop. The combination of the domain and area bytes can identify a fabric loop, or a specific loop attached to a specific switch, such as private loop 10. The port ID provides a unique identifier of a port within a domain and area, or a unique address of a device on an arbitrated loop (L_Port), e.g., the address of the loop devices 12a, b, c, d on private loop 10.

In the topology of FIG. 3, loop 10 comprises a private loop. During a loop initialization process (LIP), the loop devices 12a, b, c, d would be assigned an 8 bit arbitrated loop physical addresses (AL_PAs). The internal address assignment used by the loop devices 12a, b, c, d are zeroed out. Thus, the loop devices 12a, b, c, d communicate with each other using the 8 bit AL_PA addresses assigned during the LIP. In fact, in many private arbitrated loops, the loop devices 8a, b, c, d, d can only recognize the 8 bit AL_PA and cannot communicate beyond the 8 bit address to a fabric device 8a, b, c, d assigned a 24 bit address by the switch 4.

During the loop initialization of the private loop 10, the FL_Port would function as the loop master to provide the assignment of the 8 bit AL_PA addresses to the loop devices 12a, b, c, d. The loop master further maintains an AL_PA bitmap 22 indicating the 8 bit AL_PA addresses assigned to the loop devices 12a, b, c, d. The FL_Port 6e would be assigned an AL_PA of hex "00". Further details of loop initialization are described in the publication "Fibre Channel Arbitrated Loop (FC-AL—2), Rev. 7.0", working draft proposal of ANSI (Apr. 1, 1999), which publication is incorporated herein by reference in its entirety. The FL_Port 6e would behave strictly like a private loop 10 member with respect to the private loop devices 12a, b, c, d and at the same time facilitate communication between fabric devices 8a, b, c, d and the private loop devices 12a, b, c, d. In this way, the private loop devices 12a, b, c, d are unaware that they are communicating with fabric devices 8a, b, c, d that utilize a 24 bit address to communicate as all the mapping and translation is handled by the FL_Port 6e.

In the described implementations, the switch 4 would discover the presence of the loop devices 12a, b, c, d and register in the name server 16 a 24 bit address for each private loop device 12a, b, c, d, where the domain and area fields would uniquely identify the private loop 10 as attached to the switch 4 and the port ID would comprise the AL_PA assigned to the private loop device 12a, b, c, d during the LIP performed by the private loop 10. The switch 4 would detect and register the private loop devices 12a, b, c, d as well as fabric devices 8a, b, c, d using Fibre Channel registration techniques known in the art. Thus, after registration with the switch 4, fabric devices 8a, b, c, d address the private loop devices 12a, b, c, d using the 24 bit address maintained in the name server 16, even though the private loop devices 12a, b, c, d can only use an 8 bit address to communicate. The name server 16 would also include information indicating that the loop devices 12a, b, c, d are private loop devices. A private loop mapping 20 provides a defined correspondence of 24 bit to 8 bit addresses to allow communication between fabric devices 8a, b, c, d and private loop devices 12a, b, c, d in the manner described below. In certain implementations, the private loop mapping 20 is maintained in the FL_Port 6e, which handles all mapping and translation between fabric devices 8a, b, c, d that use a 24 bit address to communicate and private loop devices 12a, b, c, d that use an 8 bit address to communicate.

Figure 4:
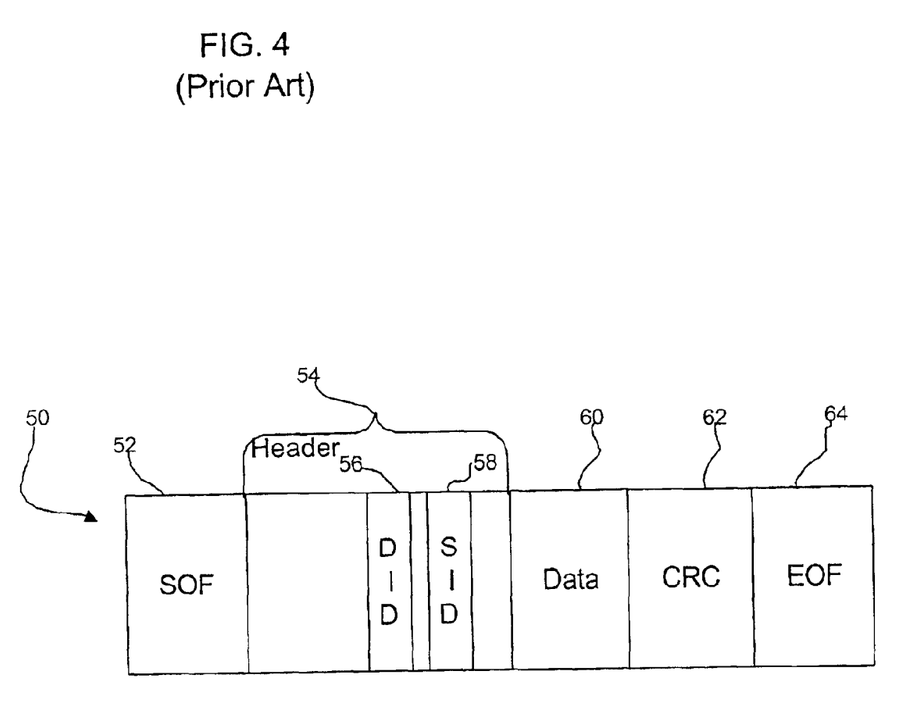
FIG. 4 illustrates the fields in a Fibre Channel frame for transferring data as known in the art.

In the Fiber Channel protocol, data and commands are communicated in frames. FIG. 4 illustrates the format of a frame 50, including:

Start of Frame (SOF) Delimiter 52: indicates a class of services requested and the sequence number of the frame in a series of related frames.

Header 54: includes source 56 and destination 58 identifiers or addresses, as well as various control fields known in the art.

Data Field 60: comprises the data being transmitted, which may be of variable length.

CRC 62: a cyclical redundancy check code to use to maintain data integrity.

End of Frame (EOF) Delimiter 64: indicates the end of the frame.

In order to communicate with the private loop devices 12a, b, c, d, the fabric devices 8a, b, c, d must perform a PLOGI to discover information and exchange service parameters with the loop devices 12a, b, c, d to determine the Fibre Channel services and class level supported by the loop devices 12a, b, c, d.

Figure 5:
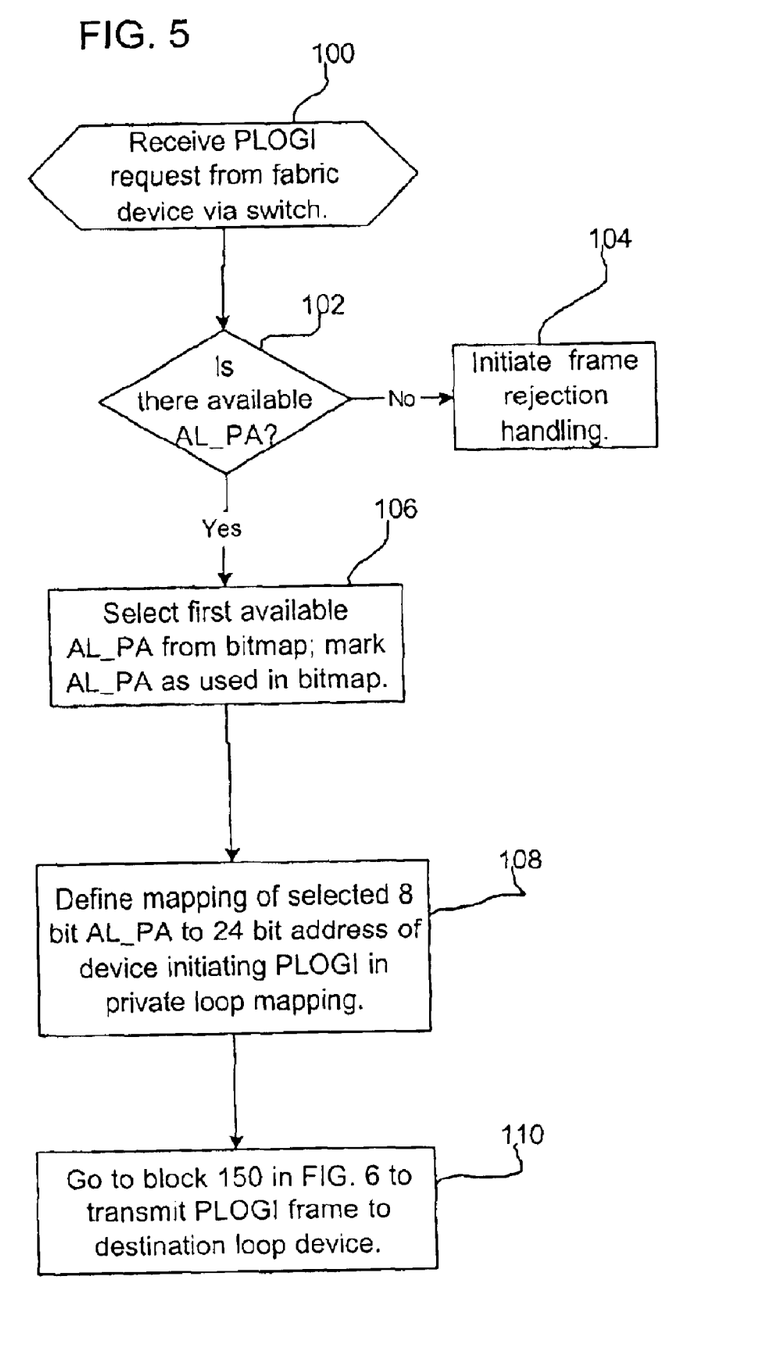
FIGS. 5–8 illustrate one implementation of logic embedded in a switch port to enable communication between fabric devices and private loop devices in accordance with certain implementations of the invention.

FIGS. 5, 6, 7, and 8 illustrate logic implemented in the FL_Port 6e to enable communication between the fabric devices 8a, b, c, d and private loop devices 12a, b, c, d. FIG. 5 illustrates logic implemented in the FL_Port 6e to establish a correspondence of an 8 bit address in the private loop 10 with a 24 bit address to enable communication between fabric devices 8a, b, c, d and private loop devices 12a, b, c, d. The FL_Port 6e may be implemented in hardware as an Application Specific Integrated Circuit (ASIC), including a buffer. Control begins at block 100 with the FL_Port 6e receiving a PLOGI request from one of the fabric devices 8a, b, c, d. The fabric device 8a, b, c, d would direct the PLOGI request to the private loop device 12a, b, c, d using the 24 bit address of the target private loop device 12a, b, c, d registered with the name server 16. The area field of the target private loop device 12a, b, c, d would identify the FL_Port 6e to enable the switch fabric controller 18 to route the PLOGI request to the FL_Port 6e to handle. The FL_Port 6e then determines (at block 102) whether an AL_PA in the private loop 10 is available. If not, then FL_Port 6e enters (at block 104) a frame rejection mode. Rejection mode may involve returning some code indicating that the switch 4 cannot deliver the frame or taking no action and letting the source fabric device 8a, b, c, d timeout. For instance, in one implementation, if the PLOGI request is for a class service other than class 3, then the FL_Port 6e may return an F_RJT code to the source fabric device 8a, b, c, d indicating that the frame is not acceptable. If the class service included in the PLOGI request is class 3, then the FL_Port 6e would ignore the request. A class 3 service does not require acknowledgment of frame delivery, unlike other class levels that require acknowledgment of frame delivery.

If (at block 102) an AL_PA is available in the AL_PA bitmap 22, then the F-Port 6e selects (at block 106) the first available address in the AL_PA bitmap 22, and then marks the selected address as used. The FL_Port 6e then defines (at block 108) in the private loop mapping 20 a correspondence of the selected 8 bit AL_PA to the 24 bit address of the fabric device 8a, b, c, d initiating the PLOGI request. The selected 8 bit AL_PA is used to represent and address the fabric device 8a, b, c, d in the private loop 10. Control then proceeds (at block 110) to block 150 in FIG. 6 to transmit the PLOGI frame to the destination loop device 12a, b, c, d using the address mapping in the private loop mapping 20.

Figure 6:
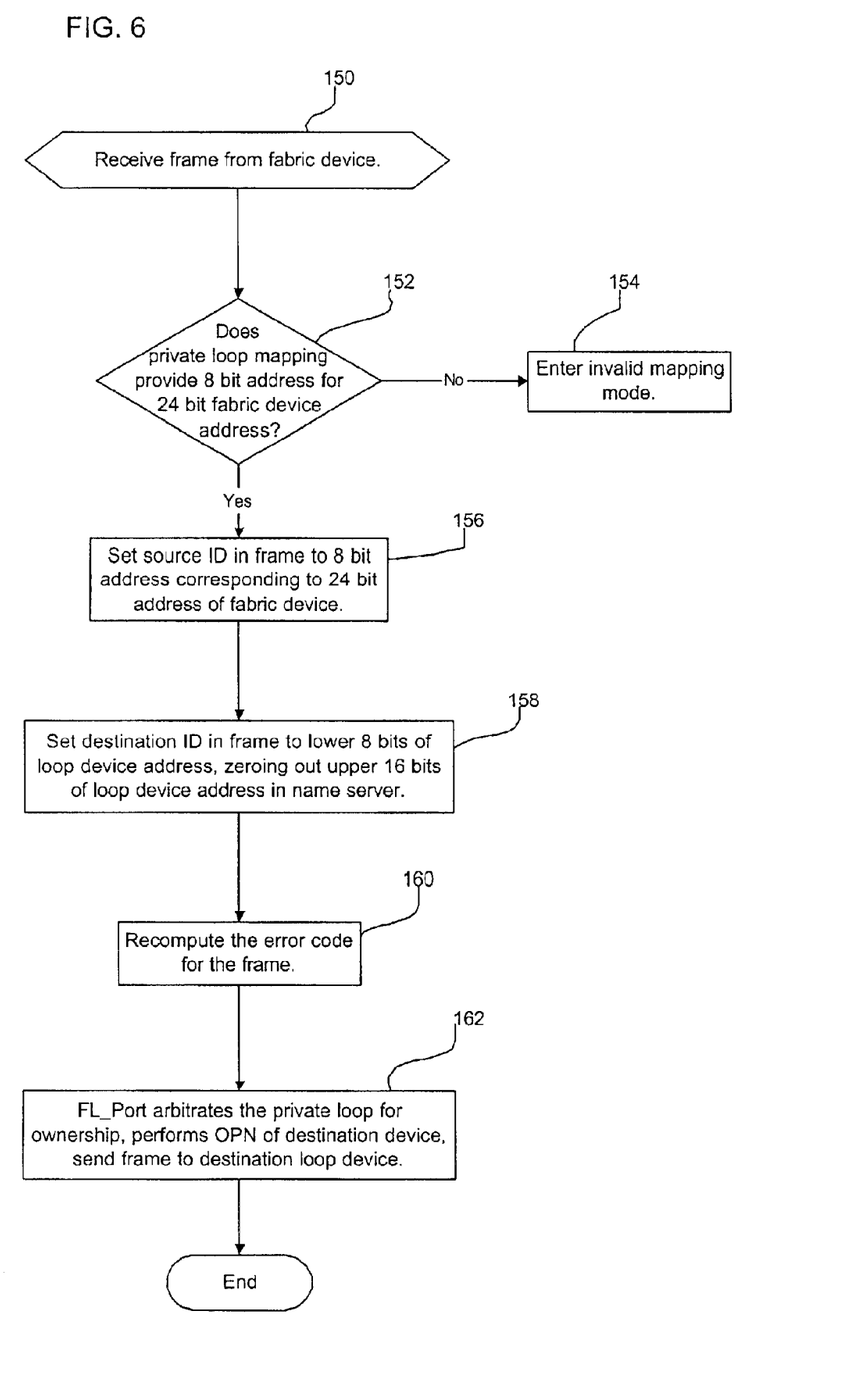

FIG. 6 illustrates logic implemented in the FL_Port 6e to forward frames from the fabric devices 8a, b, c, d to target private loop devices 12*a, b, c, d*. Control begins at block 150 with the FL_Port 6*e* receiving a frame from one fabric device 8*a, b, c, d* through the switch 4 to deliver to a private loop device 12*a, b, c, d*. If (at block 152) the private loop mapping 20 does not provide an 8 bit private loop 10 address for the 24 bit fabric device 8*a, b, c, d* address, then invalid mapping mode is entered (at block 154), where the FL_Port 6*e* returns a rejection code indicating the frame is not acceptable or ignores the frame. If (at block 152) the private loop mapping 20 provides an 8 bit loop address for the fabric device 8*a, b, c, d* transmitting the frame, then the FL_Port 6*e* sets (at block 156) the source ID (SID) 58 in the frame to the 8 bit address for the source fabric device 8*a, b, c, d* provided in the private loop mapping 20. The destination ID (DID) 56 is set (at block 158) to the lower 8 bits of the 24 bit loop device 12*a, b, c, d* address in the name server 16, where the upper 16 bits are zeroed out. The redundancy check code (CRC) 62 is recomputed (at block 160) with the new 8 bit destination 56 and source 58 IDs. At block 162, the FL_Port 6*e* then arbitrates the private loop 10 to obtain ownership of the destination loop device 12*a, b, c, d*, opens the destination NL_Port 14*a, b, c, d* on the destination loop device 12*a, b, c, d*, and then delivers the frame.

Figure 7:
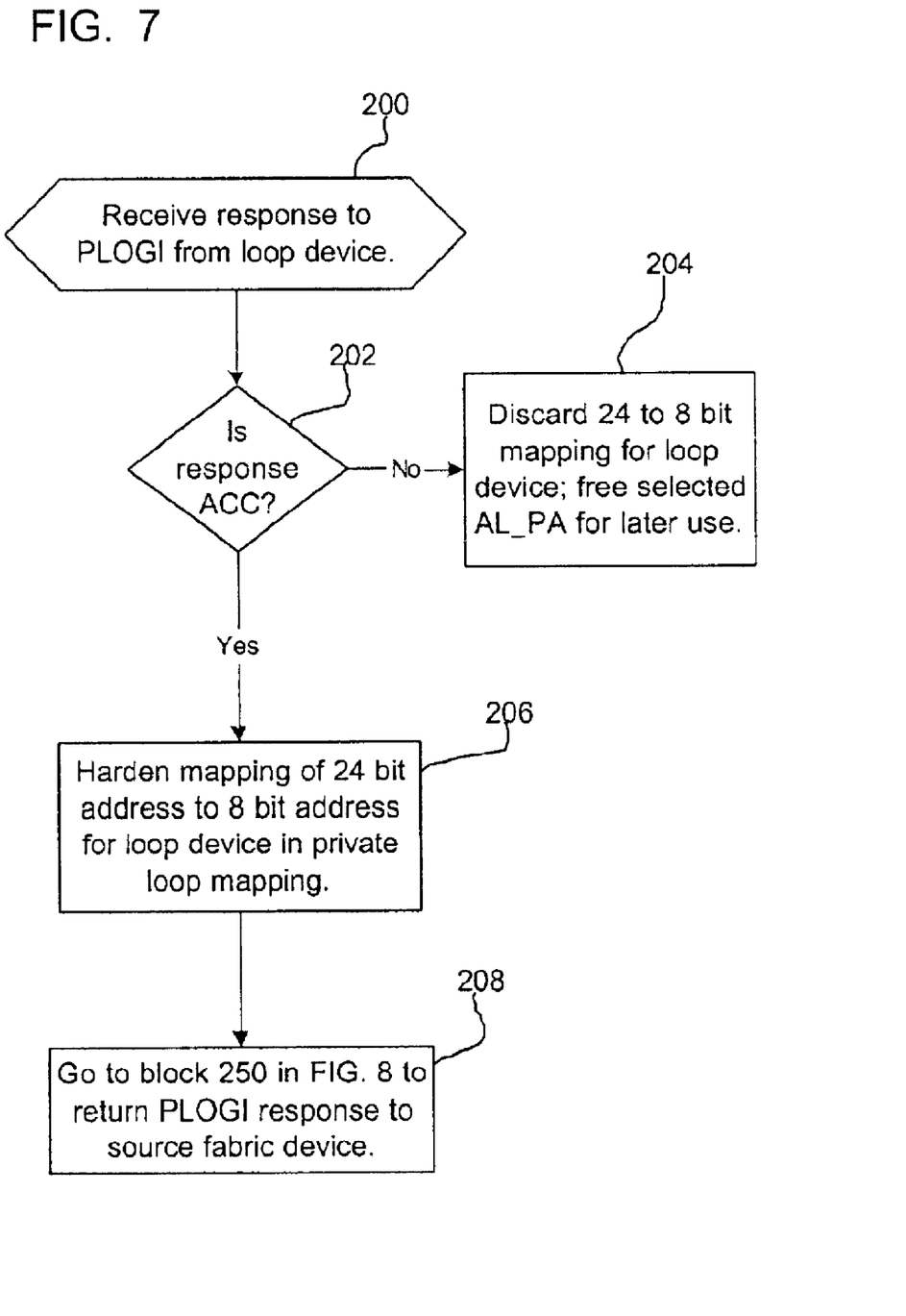

FIG. 7 illustrates logic implemented in the FL_Port 6*e* to handle the private loop device 12*a, b, c, d* response to the PLOGI. Upon receiving (at block 200) a response to the PLOGI request from the destination loop device 12*a, b, c, d*, the FL_Port 6*e* determines (at block 202) whether the response includes a PLOGI acknowledgment (ACC). If acknowledgment is not provided, then the FL_Port 6*e* discards (at block 204) the 24 to 8 bit mapping in the private loop mapping 20 and frees the selected AL_PA address in the AL_PA bitmap 22. Without maintaining the mapping of the 8 bit to 24 bit addresses for the fabric device 8*a, b, c, d*, the fabric device 8*a, b, c, d* cannot communicate with the private loop devices 12*a, b, c, d*. If (at block 202) acknowledgment (ACC) is received, then the FL_Port 6*e* hardens (at block 206) the 24 to 8 bit mapping for the fabric device 8*a, b, c, d* in the private loop mapping 20. Control then proceeds (at block 208) to block 250 in FIG. 8 to return the PLOGI response to the source fabric device 8*a, b, c, d*.

Figure 8:
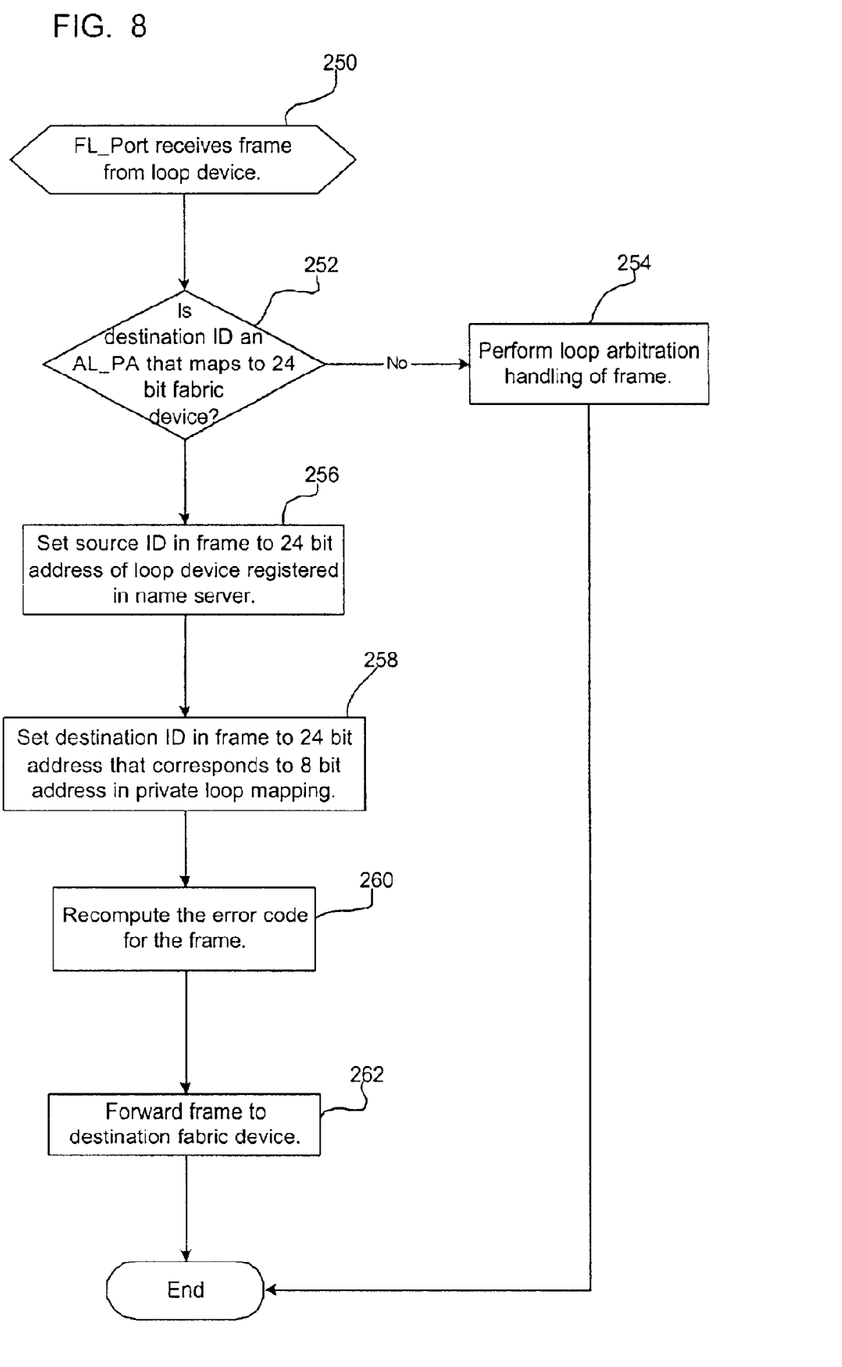

FIG. 8 illustrates logic implemented in the FL_Port 6*e* to process a frame received from a loop device 12*a, b, c, d* at block 250. If (at block 252) the destination device is a private loop device 12*a, b, c, d*, i.e., the private loop mapping 20 does not provide a 24 bit address for the 8 bit destination ID 56 address, then the FL_Port 6*e* (at block 254) performs a loop arbitration handling of the frame as a transmission between the loop devices 12*a, b, c, d* in the private loop 10 in a manner known in the art. Otherwise, if the destination is a fabric device 8*a, b, c, d*, i.e., the private loop mapping 20 does provide a correspondence of a 24 bit address to the 8 bit AL_PA address of the destination fabric device 12*a, b, c, d*, then the FL_Port 6*e* sets (at block 256) the source ID 58 in the frame to the 24 bit address of the private loop device 12*a, b, c, d* registered in the name server 16. The FL_Port 6*e* can convert the 8 bit private loop device 12*a, b, c, d* address to the 24 bit address by adding the area and domain values for the private loop 10 to the area and domain fields, or upper 16 bits, of the loop device 12*a, b, c, d* address, which would be the same area and domain fields or upper 16 bits of the FL_Port 6*e*24 bit address registered with the name server 16. The destination ID 56 in the frame is set (at block 258) to the 24 bit address the private loop mapping 20 provides for the 8 bit destination address. The FL_Port 6*e* recomputes (at block 260) the redundancy check code (CRC) 62 (FIG. 4) with the added 24 bit destination 56 and source 58 IDs and forwards (at block 262) the modified frame to the destination fabric device 8*a, b, c, d* in a manner known in the art.

With the logic of FIGS. 5, 6, 7, and 8 the FL_Port 6*e* provides a mapping and translation of the fabric device 24 bit addresses to 8 bit addresses in the private loop 10 to allow fabric devices 8*a, b, c, d* to engage in bi-directional communication with the loop devices 12*a, b, c, d*. With the implementations described with respect to FIGS. 5, 6, 7, and 8, the FL_Port 6*e* allows fabric device 8*a, b, c, d* to establish communication with private loop devices 12*a, b, c, d* without disrupting the private loop 10 and devices 12*a, b, c, d* attached thereto. The logic of FIGS. 5–8 does not cause a loop initialization (LIP) to occur at the private loop 10 that would disrupt the operations of the private loop devices 12*a, b, c, d*. There is no disruption because fabric devices seeking access to the private loop 10 utilize an open AL_PA address to establish communication. This assigned AL_PA address is then placed in the AL_PA bitmap 22 for the loop devices 12*a, b, c, d* to reference for communication with a fabric device 8*a, b, c, d*.

In certain implementations, the private loop mapping 20 remains effective until a loop initialization process (LIP) occurs on the private loop 10. Occurrence of a LIP on the private loop 10 would cause the FL_Port 6*e* to invalidate all the mappings in the private loop mapping 20 and deliver registered state change notifications (RSCNs) to all fabric devices 8*a, b, c, d* that have registered to receive such notifications. Communication between the fabric devices 8*a, b, c, d* and the loop devices 12*a, b, c, d* would not be enabled until the FL_Port 6*e* initializes a new private loop mapping 20 between the fabric device 8*a, b, c, d* requesting access to the private loop 10 and a private loop AL_PA. Without the private lop mapping 20, the fabric devices 8*a, b, c, d* cannot communicate with loop devices 12*a, b, c, d*.

Additional Implementation Details

The technique for enabling communication between network devices described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments of the configuration discovery tool are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Certain operations were described as performed by fabric controller 18 and FL_Port 6*e*. Alternatively, the operations described with respect to the fabric controller 18 and FL__Port 6e may be performed by other components of the switch 4. For instance, the mapping operations described as performed by the FL__Port 6e may be performed by some other components within the switch 4.

The described implementations provide a mapping technique used in a Fibre Channel architecture protocol to allow communication between devices using 24 bit addressing to devices that use 8 bit addressing. However, those skilled in the art will appreciate that the address mapping technique of the described implementations may be utilized with network transmission protocols other than Fibre Channel when groups of devices in the network use different addressing schemes. Accordingly, the invention is not limited to the Fibre Channel protocol environment, but may also be used to provide a mapping technique in non-Fibre Channel environments.

In described implementations, a mapping was provided between 8 bit and 24 bit addresses. In alternative implementations, the mapping may provide correspondence of address formats other than a correspondence of 24 to 8 bit address formats. Thus, implementations are not limited to an 8 to 24 bit address mapping.

In the described implementations, the mapping is established whenever the fabric device submits a PLOGI request to discover the service parameters of the private loop device 12a, b, c, d. In alternative implementations, the mapping may be established during another type of operation between the fabric and loop device.

In the described Fibre Channel protocol, data is communicated between devices in frames, including different fields, that conform to the Fibre Channel frame protocol. In alternative implementations, the frames comprising the data communicated between devices may be implemented in alternative formats according to other network communication protocols known in the art.

The topology of FIG. 3 is provided for illustration. The described address mapping implementations may apply to any fabric topology involving any number of interconnected switches, fabric devices, public and private loops, etc.

The foregoing description of various implementations of the invention has been presented for the purposes of illustration and description. It is not intended to be exhaustive or to limit the invention to the precise form disclosed Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for enabling communication between a first network device that communicates using a first address format and a second network device that communicates using a second address format, comprising:

receiving a frame from the first network device directed toward the second network device;

determining whether one address in the second address format is available to communicate with the second network device; and defining a correspondence between the first network device address in the first address format and the determined address in the second address format if one address in the second address format is available, wherein the determined address is used to represent the first network device to the second network device.

2. The method of claim 1, wherein the first network device uses an address of the second network device in the first address format to communicate with the second network device, wherein the received frame indicates the first and second network device addresses in the first address format as the source and destination addresses, respectively, further comprising:

setting the first network device address indicated in the frame to the defined corresponding address in the second address format for the first network device;

setting the second network device address indicated in the frame to a second network device address in the second address format; and transmitting the frame including the first and second network device addresses in the second address format to the second network device.

3. The method of claim 2, wherein setting the second network device address to the address in the second address format comprises transforming address bits in the second network device address in the first address format included in the received frame.

4. The method of claim 3, wherein the step of transforming the address bits to the second address format comprises zeroing out bits in the second network device address in the first address format.

5. The method of claim 2, wherein the received frame includes an error redundancy code to check data integrity of the frame, further comprising:

recalculating the error redundancy code for the frame including the first and second network device addresses in the second address format; and inserting the recalculated error redundancy code into the frame, wherein the frame including the recalculated error redundancy code is transmitted to the second network device.

6. The method of claim 2, further comprising:

receiving a response frame from the second network device in response to the transmitted frame, wherein the response frame identifies the second network device as the source and the first network device as the destination of the response frame, wherein the first and second network device addresses are in the second address format in the response frame;

setting the second network device address indicated as the source in the response frame to the registered address of the second network device in the first address format;

setting the first network device address indicated as the destination in the response frame to the address in the first address format defined as corresponding to the address in the second address format for the first network device; and transmitting the response frame including the first and second network device addresses in the first address format to the first network device.

7. The method of claim 6, wherein the second network device is a member of a group of network devices that use the second address format to communicate, wherein the first network device uses the defined corresponding address in the second address format to communicate with any member of the group of network devices, and wherein a same set of bits is used in the registered addresses of the network devices that are members of the group of network devices to identify the network devices as members of the group.

8. The method of claim 1, wherein the second network device is a member of a group of network devices that use the second address format to communicate, and wherein the first network device uses the defined corresponding address in the second address format to communicate with any member of the group of network devices.

9. The method of claim 8, wherein correspondences are defined between multiple network device addresses in the first address format and determined multiple network device addresses in the second address format, wherein the determined addresses in the second address format are used to represent the multiple network devices to the group of network devices.

10. The method of claim 9, further comprising:
performing an initialization of the group of network devices; and
invalidating the defined correspondences of the multiple network device addresses in the first address format to the second address format.

11. The method of claim 9, wherein the group of network devices comprises an arbitrated loop attached to a switch, and wherein the first network device is capable of communicating with one port on the switch.

12. The method of claim 11, wherein the network devices and switch communicate using the Fibre Channel protocol and wherein the arbitrated loop comprises a private arbitrated loop.

13. The method of claim 11, wherein the switch includes a port to which the arbitrated loop is connected, wherein the port registers the addresses of the first and second network devices, receives the frame from the first network device, determines whether one address in the second address format is available, and defines the correspondence.

14. The method of claim 1, wherein the first network device transmits the frame to discover service parameters from the second network device to enable communication therebetween.

15. The method of claim 14, wherein the network devices communicate using the Fibre Channel protocol and wherein the first network device transmits the frame as part of a Fibre Channel PLOGI operation.

16. The method of claim 1, wherein after defining the correspondence of the first network device address in the first address format to one address in the second address format, performing:
receiving a subsequent frame from the first network device, wherein the subsequent frame indicates the first and second network device addresses in the first address format as the source and destination addresses, respectively;
determining the first network device address in the second address format corresponding to the address in the first address format in the subsequent frame according to the defined correspondence;
setting the first network device address indicated in the subsequent frame to the corresponding first network device address in the second address format;
setting the second network device address indicated in the subsequent frame to a second network device address in the second address format; and
transmitting the subsequent frame including the first and second network device addresses in the second address format to the destination network device.

17. A system for enabling communication between a first network device that communicates using a first address format and a second network device that communicates using a second address format, comprising:

means for receiving a frame from the first network device directed toward the second network device;
means for determining whether one address in the second address format is available to communicate with the second network device; and
means for defining a correspondence between the first network device address in the first address format and the determined address in the second address format if one address in the second address format is available, wherein the determined address is used to represent the first network device to the second network device.

18. The system of claim 17, wherein the first network device uses an address of the second network device in the first address format to communicate with the second network device, wherein the received frame indicates the first and second network device addresses in the first address format as the source and destination addresses, respectively, further comprising:
means for setting the first network device address indicated in the frame to the defined corresponding address in the second address format for the first network device;
means for setting the second network device address indicated in the frame to a second network device address in the second address format; and
means for transmitting the frame including the first and second network device addresses in the second address format to the second network device.

19. The system of claim 18, wherein the means for setting the second network device address to the address in the second address format transforms address bits in the second network device address in the first address format included in the received frame.

20. The system of claim 19, wherein transforming the address bits to the second address format comprises zeroing out bits in the second network device address in the first address format.

21. The system of claim 18, wherein the received frame includes an error redundancy code to check data integrity of the frame, further comprising:
means for recalculating the error redundancy code for the frame including the first and second network device addresses in the second address format; and
means for inserting the recalculated error redundancy code into the frame, wherein the frame including the recalculated error redundancy code is transmitted to the second network device.

22. The system of claim 18, further comprising:
means for receiving a response frame from the second network device in response to the transmitted frame, wherein the response frame identifies the second network device as the source and the first network device as the destination of the response frame, wherein the first and second network device addresses are in the second address format in the response frame;
means for setting the second network device address indicated as the source in the response frame to the registered address of the second network device in the first address format;
means for setting the first network device address indicated as the destination in the response frame to the address in the first address format defined as corresponding to the address in the second address format for the first network device; and
means for transmitting the response frame including the first and second network device addresses in the first address format to the first network device.

23. The system of claim 22, wherein the second network device is a member of a group of network devices that use the second address format to communicate, wherein the first network device uses the defined corresponding address in the second address format to communicate with any member of the group of network devices, and wherein a same set of bits is used in the registered addresses of the network devices that are members of the group of network devices to identify the network devices as members of the group.

24. The system of claim 17, wherein the second network device is a member of a group of network devices that use the second address format to communicate, and wherein the first network device uses the defined corresponding address in the second address format to communicate with any member of the group of network devices.

25. The system of claim 24, wherein correspondences are defined between multiple network device addresses in the first address format and determined multiple network device addresses in the second address format, wherein the determined addresses in the second address format are used to represent the multiple network devices to the group of network devices.

26. The system of claim 25, further comprising:
means for performing an initialization of the group of network devices; and
means for invalidating the defined correspondences of the multiple network device addresses in the first address format to the second address format.

27. The system of claim 25, wherein the group of network devices comprises an arbitrated loop attached to a switch, and wherein the first network device is capable of communicating with one port on the switch.

28. The system of claim 27, wherein the network devices and switch communicate using the Fibre Channel protocol and wherein the arbitrated loop comprises a private arbitrated loop.

29. The system of claim 27, wherein the switch includes a port to which the arbitrated loop is connected, wherein the port registers the addresses of the first and second network devices, receives the frame from the first network device, determines whether one address in the second address format is available, and defines the correspondence.

30. The system of claim 17, wherein the first network device transmits the frame to discover service parameters from the second network device to enable communication therebetween.

31. The system of claim 30, wherein the network devices communicate using the Fibre Channel protocol and wherein the first network device transmits the frame as part of a Fibre Channel PLOGI operation.

32. The system of claim 17, further comprising:
means for receiving a subsequent frame from the first network device after defining the correspondence of the first network device address in the first address format to one address in the second address format, wherein the subsequent frame indicates the first and second network device addresses in the first address format as the source and destination addresses, respectively;
means for determining the first network device address in the second address format corresponding to the address in the first address format in the subsequent frame according to the defined correspondence;
means for setting the first network device address indicated in the subsequent frame to the corresponding first network device address in the second address format;
means for setting the second network device address indicated in the subsequent frame to a second network device address in the second address format; and means for transmitting the subsequent frame including the first and second network device addresses in the second address format to the destination network device.

33. A network system, comprising:
a first network device that communicates using a first address format;
a second network device that communicate using a second address format;
a switch providing a path between the first and second network devices, including:
(i) an address registry including addresses of the first and second network devices in the first address format;
(ii) logic implemented within the switch capable of performing:
(a) receiving a frame from the first network device directed toward the second network device;
(b) determining whether one address in the second address format is available to communicate with the second network device; and
(c) defining a correspondence between the first network device address in the first address format and the determined address in the second address format if one address in the second address format is available, wherein the determined address is used to represent the first network device to the second network device.

34. The network system of claim 33, wherein the received frame indicates the first and second network device addresses in the first address format as the source and destination addresses, respectively, and wherein the logic implemented in the switch further performs:
setting the first network device address indicated in the frame to the defined corresponding address in the second address format for the first network device;
setting the second network device address indicated in the frame to a second network device address in the second address format; and
transmitting the frame including the first and second network device addresses in the second address format to the second network device.

35. The network system of claim 34, wherein the logic implemented in the switch further performs:
receiving a response frame from the second network device in response to the transmitted frame, wherein the response frame identifies the second network device as the source and the first network device as the destination of the response frame, wherein the first and second network device addresses are in the second address format in the response frame;
setting the second network device address indicated as the source in the response frame to the registered address of the second network device in the first address format;
setting the first network device address indicated as the destination in the response frame to the address in the first address format defined as corresponding to the address in the second address format for the first network device; and
transmitting the response frame including the first and second network device addresses in the first address format to the first network device.

36. The network system of claim 33, further comprising:
a group of network devices, including the second network device, that use the second address format to communicate, and wherein the first network device uses the defined corresponding address in the second address format to communicate with any member of the group of network devices.

37. The network system of claim 36, further comprising: multiple network devices, including the first network device, that use the first address format to communicate, wherein correspondences are defined between multiple network device addresses in the first address format and determined multiple network device addresses in the second address format, wherein the determined addresses in the second address format are used to represent the multiple network devices to the group of network devices.

38. The network system of claim 36, wherein the group of network devices comprises an arbitrated loop attached to the switch, and wherein the first network device is capable of communicating with one port on the switch.

39. The network system of claim 33, wherein the logic implemented by the switch is embedded in a port card on the switch that is in a path between the first and second network devices.

40. The network system of claim 36, wherein the network devices and switch communicate using the Fibre Channel protocol and wherein the arbitrated loop comprises a private arbitrated loop.

41. An article of manufacture for use in enabling communication between a first network device that communicates using a first address format and a second network device that communicates using a second address format by:
    receiving a frame from the first network device directed toward the second network device;
    determining whether one address in the second address format is available to communicate with the second network device; and
    defining a correspondence between the first network device address in the first address format and the determined address in the second address format if one address in the second address format is available, wherein the determined address is used to represent the first network device to the second network device.

42. The article of manufacture of claim 41, wherein the first network device uses an address of the second network device in the first address format to communicate with the second network device, wherein the received frame indicates the first and second network device addresses in the first address format as the source and destination addresses, respectively, further comprising:
    setting the first network device address indicated in the frame to the defined corresponding address in the second address format for the first network device;
    setting the second network device address indicated in the frame to a second network device address in the second address format; and
    transmitting the frame including the first and second network device addresses in the second address format to the second network device.

43. The article of manufacture of claim 42, wherein setting the second network device address to the address in the second address format comprises transforming address bits in the second network device address in the first address format included in the received frame.

44. The article of manufacture of claim 43, wherein the step of transforming the address bits to the second address format comprises zeroing out bits in the second network device address in the first address format.

45. The article of manufacture of claim 42, wherein the received frame includes an error redundancy code to check data integrity of the frame, further comprising:
    recalculating the error redundancy code for the frame including the first and second network device addresses in the second address format; and
    inserting the recalculated error redundancy code into the frame, wherein the frame including the recalculated error redundancy code is transmitted to the second network device.

46. The article of manufacture of claim 42, further comprising:
    receiving a response frame from the second network device in response to the transmitted frame, wherein the response frame identifies the second network device as the source and the first network device as the destination of the response frame, wherein the first and second network device addresses are in the second address format in the response frame;
    setting the second network device address indicated as the source in the response frame to the registered address of the second network device in the first address format;
    setting the first network device address indicated as the destination in the response frame to the address in the first address format defined as corresponding to the address in the second address format for the first network device; and
    transmitting the response frame including the first and second network device addresses in the first address format to the first network device.

47. The article of manufacture of claim 46, wherein the second network device is a member of a group of network devices that use the second address format to communicate, wherein the first network device uses the defined corresponding address in the second address format to communicate with any member of the group of network devices, and wherein a same set of bits is used in the registered addresses of the network devices that are members of the group of network devices to identify the network devices as members of the group.

48. The article of manufacture of claim 41, wherein the second network device is a member of a group of network devices that use the second address format to communicate, and wherein the first network device uses the defined corresponding address in the second address format to communicate with any member of the group of network devices.

49. The article of manufacture of claim 48, wherein correspondences are defined between multiple network device addresses in the first address format and determined multiple network device addresses in the second address format, wherein the determined addresses in the second address format are used to represent the multiple network devices to the group of network devices.

50. The article of manufacture of claim 49, further comprising:
    performing an initialization of the group of network devices; and
    invalidating the defined correspondences of the multiple network device addresses in the first address format to the second address format.

51. The article of manufacture of claim 49, wherein the group of network devices comprises an arbitrated loop attached to a switch, and wherein the first network device is capable of communicating with one port on the switch.

52. The article of manufacture of claim 51, wherein the network devices and switch communicate using the Fibre Channel protocol and wherein the arbitrated loop comprises a private arbitrated loop.

53. The article of manufacture of claim 51, wherein the switch includes a port to which the arbitrated loop is connected, wherein the port registers the addresses of the first and second network devices, receives the frame from the first network device, determines whether one address in the second address format is available, and defines the correspondence.

54. The article of manufacture of claim 41, wherein the first network device transmits the frame to discover service parameters from the second network device to enable communication therebetween.

55. The article of manufacture of claim 54, wherein the network devices communicate using the Fibre Channel protocol and wherein the first network device transmits the frame as part of a Fibre Channel PLOGI operation.

56. The article of manufacture of claim 41, wherein after defining the correspondence of the first network device address in the first address format to one address in the second address format, performing:

receiving a subsequent frame from the first network device, wherein the subsequent frame indicates the first and second network device addresses in the first address format as the source and destination addresses, respectively;

determining the first network device address in the second address format corresponding to the address in the first address format in the subsequent frame according to the defined correspondence;

setting the first network device address indicated in the subsequent frame to the corresponding first network device address in the second address format;

setting the second network device address indicated in the subsequent frame to a second network device address in the second address format; and transmitting the subsequent frame including the first and second network device addresses in the second address format to the destination network device.

* * * * *